US011703728B2

(12) United States Patent
Shim et al.

(10) Patent No.: US 11,703,728 B2
(45) Date of Patent: Jul. 18, 2023

(54) BLACK MATRIX COMPOSITION AND DISPLAY DEVICE COMPRISING THE SAME

(71) Applicant: Samsung Display Co., LTD., Yongin-si (KR)

(72) Inventors: Yi Seop Shim, Suwon-si (KR); Su Jeong Kim, Yongin-si (KR); Mi Hwa Lee, Seoul (KR); Yun Ho Lee, Cheonan-si (KR); Jun Woo Lee, Seongnam-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 16/926,016

(22) Filed: Jul. 10, 2020

(65) Prior Publication Data

US 2021/0215980 A1    Jul. 15, 2021

(30) Foreign Application Priority Data

Jan. 9, 2020 (KR) ........................ 10-2020-0002944

(51) Int. Cl.
G02F 1/1368 (2006.01)
G02F 1/1362 (2006.01)

(52) U.S. Cl.
CPC ...... *G02F 1/136209* (2013.01); *G02F 1/1368* (2013.01); *G02F 1/136286* (2013.01); *G02F 2201/123* (2013.01)

(58) Field of Classification Search
CPC ......... G02F 1/136209; G02F 1/136286; G02F 1/1368; G02F 2201/123; G02F 1/133512
See application file for complete search history.

(56) References Cited

U.S. PATENT DOCUMENTS

| 5,512,215 A * | 4/1996 | Tachizono ............. G02B 5/201 252/582 |
| 5,718,746 A * | 2/1998 | Nagasawa ............... C09C 1/565 106/478 |
| 5,925,484 A * | 7/1999 | Shima .................... G02B 5/223 430/7 |
| 2009/0051860 A1 | 2/2009 | Hiruma et al. |
| 2009/0078578 A1 | 3/2009 | Lin et al. |
| 2012/0181557 A1 | 7/2012 | Kim et al. |
| 2013/0141687 A1* | 6/2013 | Wang ................ G02F 1/133512 349/158 |

(Continued)

FOREIGN PATENT DOCUMENTS

| CN | 101394712 | 3/2009 |
| CN | 102156368 | 8/2011 |

(Continued)

OTHER PUBLICATIONS

Kohei Mizuno et al., "A black body absorber from vertically aligned single-walled carbon nanotubes", PNAS, Apr. 14, 2009, pp. 6044-6047, vol. 106, No. 15.

*Primary Examiner* — James A Dudek
(74) *Attorney, Agent, or Firm* — Kile Park Reed & Houtteman PLLC (57) ABSTRACT

A black matrix composition and a display device including the same are provided. The black matrix composition includes solids including a pigment including a carbon black and an array of vertically aligned carbon nanotubes, a binder, a monomer, a photoinitiator and an additive, and a solvent.

4 Claims, 5 Drawing Sheets

(56) References Cited

U.S. PATENT DOCUMENTS

| | | | |
|---|---|---|---|
| 2014/0099493 A1* | 4/2014 | Liu | ................. B82B 3/0033 |
| | | | 428/220 |
| 2014/0162178 A1 | 6/2014 | Na | |
| 2016/0004125 A1 | 1/2016 | Li et al. | |
| 2016/0266677 A1* | 9/2016 | Liu | ................. G06F 3/0412 |
| 2018/0107052 A1 | 4/2018 | Jiang et al. | |
| 2019/0287753 A1 | 9/2019 | Weber | |

FOREIGN PATENT DOCUMENTS

| | | |
|---|---|---|
| CN | 103602132 | 2/2014 |
| CN | 103676331 | 3/2014 |
| CN | 103698925 | 4/2014 |
| CN | 103869622 | 6/2014 |
| CN | 105607332 | 5/2016 |
| CN | 110167873 | 8/2019 |
| KR | 10-0705236 | 4/2007 |
| KR | 10-2011-0067520 | 6/2011 |
| KR | 2011-0130151 | 12/2011 |
| KR | 10-1827849 | 2/2018 |

\* cited by examiner

BLACK MATRIX COMPOSITION AND DISPLAY DEVICE COMPRISING THE SAME

CROSS REFERENCE TO RELATED APPLICATION(S)

This application claims priority to and benefits of Korean Patent Application No. 10-2020-0002944 under 35 U.S.C. § 119, filed on Jan. 9, 2020, in the Korean Intellectual Property Office, the entire contents of which are incorporated herein by reference.

BACKGROUND

1. Technical Field

The disclosure relates to a display device, and to a display device having a black matrix composition.

2. Description of the Related Art

Display devices become more important as multimedia technology is progressed. Various types of display devices have been developed such as liquid-crystal display (LCD) devices and organic light-emitting display (OLED) devices. Liquid-crystal display devices and organic light-emitting display devices may include a black matrix that may absorb light in order to prevent color mixing, to improve the contrast ratio, and the like. The black matrix may have an optical density and a reflectance. The black matrix used in display devices may be required to have a low reflectance and a high optical density. However, as the optical density of the black matrix increases, the reflectance also increases. Therefore, further researches have been contributed for the development of the black matrix in display devices.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

Embodiments provide a black matrix composition with a lower reflectance and a higher optical density.

Embodiments also include a display device capable of reducing the reflectance and improving the display quality.

However, embodiments of the disclosure are not restricted to those set forth herein. The above and other embodiments of the disclosure will become more apparent to one of ordinary skill in the art to which the disclosure pertains by referencing the detailed description of the disclosure given below.

According to an embodiment, a black matrix composition may include a carbon black as well as an array of vertically aligned carbon nanotubes as a pigment, so that it may be possible to increase the optical density and lower the reflectance of the black matrix. As a display device includes the black matrix which may exhibit a high optical density and a low reflectance, the display quality may be improved.

It should be noted that effects are not limited to those described above and other effects of the disclosure will be apparent to those skilled in the art from the following descriptions.

According to an aspect, there is provided a composition for a black matrix that may comprise solids comprising a pigment including a carbon black and an array of vertically aligned carbon nanotubes, a binder, a monomer, a photoinitiator and an additive, and a solvent.

In an embodiment, the array of vertically aligned carbon nanotubes may include a base layer and a plurality of carbon nanotubes spaced apart from one another on the base layer.

In an embodiment, each of the plurality of carbon nanotubes may have an end in contact with a surface of the base layer and another end disposed in a direction perpendicular to the surface of the base layer.

In an embodiment, the base layer may include one of a glass substrate, a silicon wafer, and a metal layer.

In an embodiment, the array of vertically aligned carbon nanotubes may be in a form of flakes.

In an embodiment, a content of the solids may be in a range from about 12 to about 25 parts by weight per 100 parts by weight of the total composition of the black matrix.

In an embodiment, a content of the pigment may be in a range from about 15 to about 50 parts by weight per 100 parts by weight of the solids.

In an embodiment, a content of the flakes of the array of vertically aligned carbon nanotubes may be in a range from about 15 to about 85 parts by weight per 100 parts by weight of the pigment.

In an embodiment, a content of the binder may be in a range from about 25 to about 40 parts by weight per 100 parts by weight of the solids.

In an embodiment, a content of the monomer may be in a range from about 25 to about 40 parts by weight per 100 parts by weight of the solids.

In an embodiment, a content of the photoinitiator may be in a range from about 1 to about 10 parts by weight per 100 parts by weight of the solids.

In an embodiment, a content of the additive may be in a range from about 0.1 to about 1 parts by weight per 100 parts by weight of the solids.

In an embodiment, a content of the solvent may be in a range from about 75 to about 88 parts by weight per 100 parts by weight of the total composition of the black matrix.

According to an embodiment a display device may comprise a first substrate including a switching element and a pixel electrode electrically connected to the switching element, and a second substrate opposite to the first substrate and including a black matrix, wherein the black matrix may comprise a carbon black and an array of vertically aligned carbon nanotubes.

In an embodiment, the array of vertically aligned carbon nanotubes may include a base layer and a plurality of carbon nanotubes spaced apart from one another on the base layer.

In an embodiment, each of the plurality of carbon nanotubes may have an end in contact with a surface of the base layer and another end disposed in a direction perpendicular to the surface of the base layer.

In an embodiment, the base layer may include one of a glass substrate, a silicon wafer, and a metal layer.

In an embodiment, the array of vertically aligned carbon nanotubes may be in a form of flakes.

In an embodiment, the black matrix may have an optical density in a range from about 3.95 to about 4.05.

In an embodiment, the black matrix may have a reflectance in a range from about 0.5 to about 0.7%.

BRIEF DESCRIPTION OF THE DRAWINGS

Embodiments will become more apparent by describing in detail embodiments thereof with reference to the attached drawings, in which.

DETAILED DESCRIPTION OF THE EMBODIMENTS

The disclosure will now be described more fully hereinafter with reference to the accompanying drawings, in which embodiments are shown. This disclosure may, however, be embodied in different forms and should not be construed as limited to the embodiments set forth herein. Rather, these embodiments are provided so that this disclosure will be thorough and complete, and will fully convey the scope of the disclosure to those skilled in the art.

It will also be understood that when a layer is referred to as being "on" another layer or substrate, it may be directly on the other layer or substrate, or intervening layers may also be present. The same reference numbers indicate the same components throughout the specification.

Further, in the specification, the phrase "in a plan view" means when an object portion is viewed from above, and the phrase "in a schematic cross-sectional view" means when a schematic cross-section taken by vertically cutting an object portion is viewed from the side.

Additionally, the terms "overlap" or "overlapped" mean that a first object may be above or below a second object, and vice versa. The terms "face" and "facing" mean that a first object may directly or indirectly oppose a second object. In a case in which a third object intervenes between the first and second object, the first and second objects may be understood as being indirectly opposed to one another, although still facing each other.

The spatially relative terms "below", "beneath", "lower", "above", "upper", or the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in other directions and thus the spatially relative terms may be interpreted differently depending on the orientations.

Throughout the specification, when an element is referred to as being "connected" to another element, the element may be "directly connected" to another element, or "electrically connected" to another element with one or more intervening elements interposed therebetween. It will be further understood that when the terms "comprises," "comprising," "includes" and/or "including" are used in this specification, they or it may specify the presence of stated features, integers, steps, operations, elements and/or components, but do not preclude the presence or addition of other features, integers, steps, operations, elements, components, and/or any combination thereof.

It will be understood that, although the terms "first," "second," "third," or the like may be used herein to describe various elements, these elements should not be limited by these terms. These terms are used to distinguish one element from another element or for the convenience of description and explanation thereof. For example, when "a first element" is discussed in the description, it may be termed "a second element" or "a third element," and "a second element" and "a third element" may be termed in a similar manner without departing from the teachings herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or." In the specification and the claims, the phrase "at least one of" is intended to include the meaning of "at least one selected from the group of" for the purpose of its meaning and interpretation. For example, "at least one of A and B" may be understood to mean "A, B, or A and B."

Unless otherwise defined, all terms used herein (including technical and scientific terms) have the same meaning as commonly understood by those skilled in the art to which this disclosure pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the specification.

Hereinafter, embodiments of the disclosure will be described with reference to the accompanying drawings.

Figure 1:
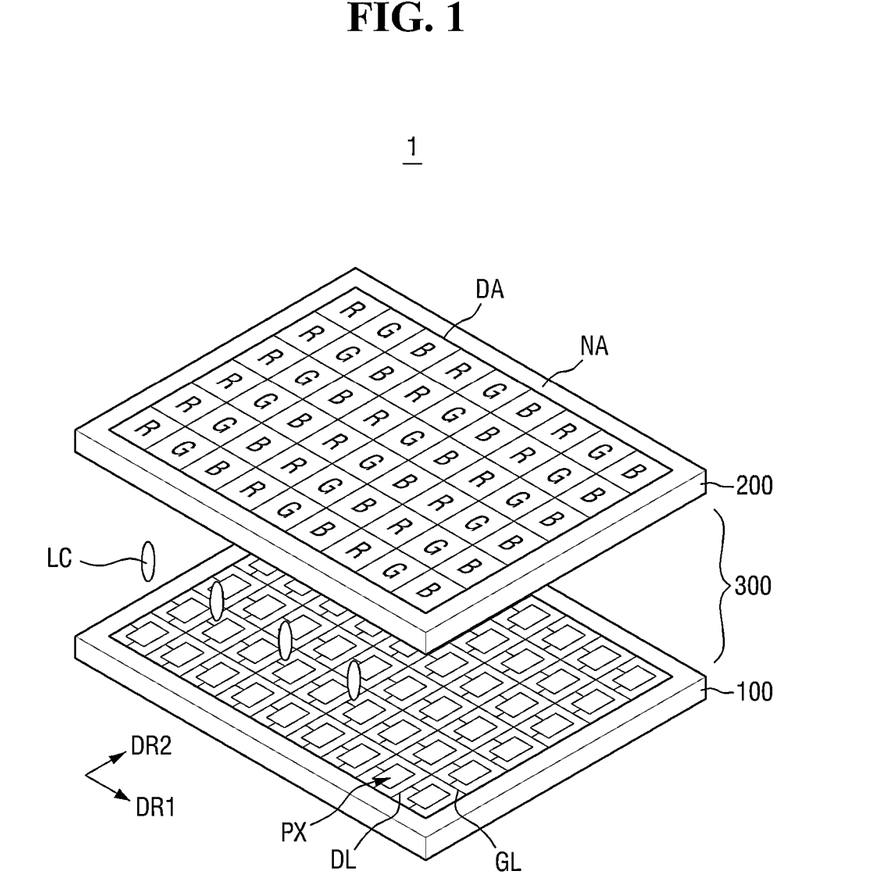
FIG. 1 is an exploded, perspective view showing a display device according to an embodiment.

FIG. 1 is a schematic perspective view showing a display device according to an embodiment.

Referring to FIG. 1, a display device 1 according to an embodiment may be applied to, a smart phone, a mobile phone, a tablet PC, a personal digital assistant (PDA), a portable multimedia player (PMP), a television set, a game machine, a wristwatch-type electronic device, a head-mounted display, a personal computer monitor, a laptop computer, a navigation system, a vehicle instrument cluster, a digital camera, a camcorder, an outdoor billboard, an electronic billboard, an automobile, various medical apparatuses, various home appliances such as a refrigerator and a laundry machine, Internet of things (IoT) devices, for example within the spirit and the scope of the disclosure.

The display device 1 according to embodiments may be variously classified by the way in which images may be displayed. Examples of the classification of display devices may include an organic light-emitting display device (OLED), an inorganic light-emitting display device (inorganic EL), a quantum-dot light-emitting display device (QED), a micro LED display device (micro-LED), a nano LED display device (nano-LED), a plasma display device (PDP), a field emission display device (FED) and a cathode ray display device (CRT), a liquid-crystal display device (LCD), an electrophoretic display device (EPD), for example within the spirit and the scope of the disclosure. In the following description, a liquid-crystal display device will be described as an example of the display device, and the liquid-crystal display device may be simply referred to as a display device unless it is necessary to discern them. It is, however, to be understood that the embodiments are not limited to the liquid-crystal display panel, and any other display device listed above or other may be employed without departing from the scope of the disclosure.

According to an embodiment, the display device may include a first substrate 100, a second substrate 200 opposed to the first substrate 100, and a liquid-crystal layer 300 interposed or disposed between the first substrate 100 and the second substrate 200. The liquid-crystal layer 300 may include multiple liquid crystals LC, and the liquid crystals LC may have a negative dielectric anisotropy. According to an embodiment, the display device may include a display area DA and a non-display area NA. The display area DA may be an area where images may be displayed, and the non-display area NA may surround or may be adjacent to the display area DA to block the light. The display area DA may include multiple pixels PX. Each of the pixels PX may display one of the primary colors for color reproduction. For example, multiple pixels PX may include red pixels R displaying red, green pixels G displaying green, and blue pixels B displaying blue. The red pixels R, the green pixels G and the blue pixels B may be repeatedly arranged or disposed in the first direction DR1 and the second direction DR2 so that they may be arranged or disposed in a matrix. A gate line GL may be extended in the first direction DR1 and a data line DL may be extended in the second direction DR2, so that a gate driving signal and a data driving signal may be transmitted to each of the multiple pixels PX.

Figure 2:
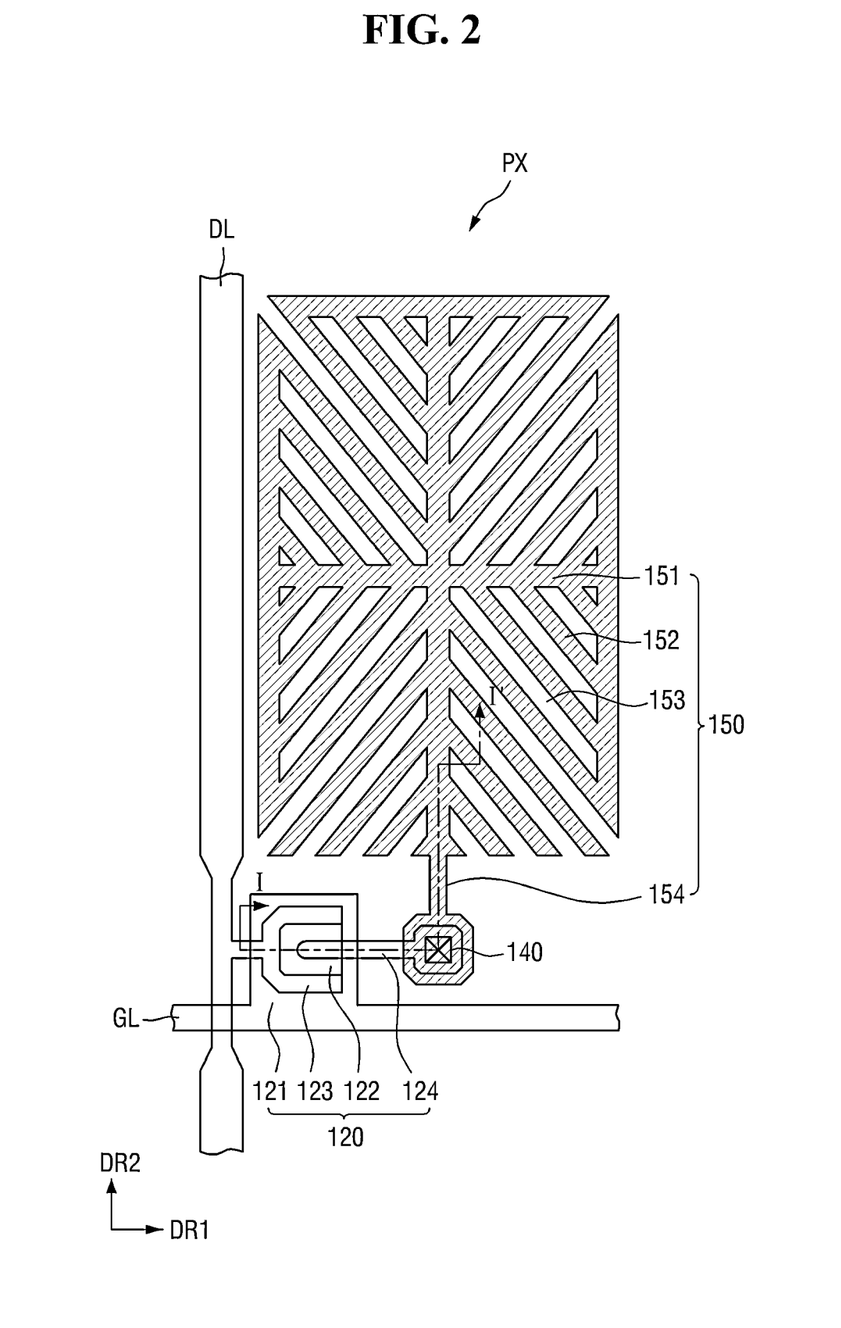
FIG. 2 is a plan view showing a layout of one of the pixels of FIG. 1.
Figure 3:
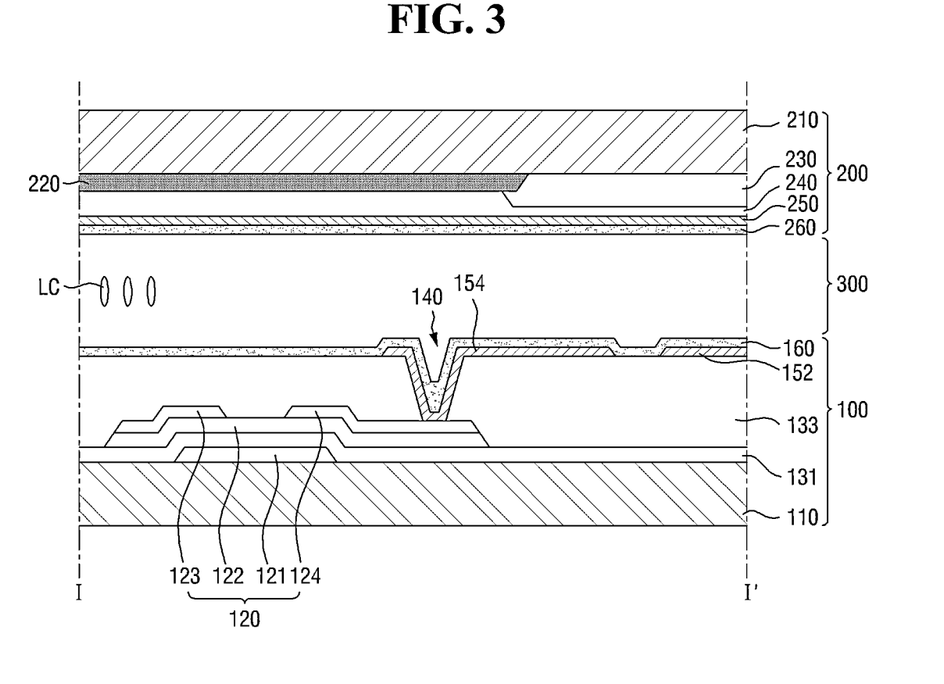
FIG. 3 is a schematic cross-sectional view taken along line I-I' of FIG. 2.

FIG. 2 is a plan view showing a layout of one of the pixels of FIG. 1. FIG. 3 is a schematic cross-sectional view taken along line I-I' of FIG. 2.

Referring to FIGS. 2 and 3, the first substrate 100 may be a substrate on which a switching element 120 that may control the alignment of the liquid-crystals LC in the liquid-crystal layer 300 may be disposed, and the second substrate 200 may be an opposite substrate that may seal the first substrate 100 with the liquid crystal layer 300 therebetween.

The first substrate 100 may include a first insulating substrate 110, a switching element 120 disposed on the first insulating substrate 110, and a pixel electrode 150 disposed above the switching element 120.

The first insulating substrate 110 may be a transparent insulating substrate. For example, the first insulating substrate 110 may be a glass or plastic substrate. The first insulating substrate 110 may be flexible.

The switching element 120 may be disposed on the first insulating substrate 110. The switching element 120 may be a thin-film transistor including a gate electrode 121 disposed on the first insulating substrate 110, a semiconductor layer 122 disposed on the gate electrode 121, and a source electrode 123 and a drain electrode 124 spaced apart from each other disposed on the semiconductor layer 122.

The gate electrode 121 may be electrically connected to the gate line GL to transmit a gate driving signal. The gate electrode 121 may be formed of one selected from the group consisting of: molybdenum (Mo), aluminum (Al), chromium (Cr), gold (Au), titanium (Ti), nickel (Ni), neodymium (Nd) and copper (Cu) or an alloy thereof. The gate electrode 121 may be formed of multiple layers formed of one selected from the group consisting of: molybdenum (Mo), aluminum (Al), chromium (Cr), gold (Au), titanium (Ti), nickel (Ni), neodymium (Nd) and copper (Cu) or an alloy thereof. For example, the gate electrode 121 may be a double layer of molybdenum/aluminum-neodymium or molybdenum/aluminum.

A gate insulating layer 131 may be disposed on the gate electrode 121 to isolate the gate electrode 121. The gate insulating layer 131 may be formed of a single layer or multiple layers formed of silicon oxide (SiOx), silicon nitride (SiNx), or silicon oxynitride (SiOxNy).

A semiconductor layer 122 may be disposed on the gate insulating layer 131. The semiconductor layer 122 may overlap the gate electrode 121 on the gate insulating layer 131. The semiconductor layer 122 may be formed of a silicon semiconductor or an oxide semiconductor. A silicon semiconductor may include amorphous silicon or crystallized polycrystalline silicon. Polycrystalline silicon has a high mobility (about 100 $cm^2/Vs$ or more), a low energy consumption and high reliability, while an oxide semiconductor has a low off-state current. Accordingly, they may be employed optionally according to an embodiment.

The source electrode 123 and the drain electrode 124 may be spaced apart from each other and may be disposed on the semiconductor layer 122. The source electrode 123 may be electrically connected to the data line DL to transfer a data driving signal, and the drain electrode 124 may be electrically connected to the pixel electrode 150.

The source electrode 123 and the drain electrode 124 may be formed of a single layer or multiple layers. In case that the source electrode 123 and the drain electrode 124 are formed of a single layer, they may be formed of one selected from the group consisting of: molybdenum (Mo), aluminum (Al), chromium (Cr), gold (Au), titanium (Ti), nickel (Ni), neodymium (Nd) and copper (Cu) or an alloy thereof. In case that the source electrode 123 and the drain electrode 124 are formed of multiple layers, they may be formed of double layers of copper/titanium or molybdenum/aluminum-neodymium, triple layers of titanium/aluminum/titanium, molybdenum/aluminum/molybdenum or molybdenum/aluminum-neodymium/molybdenum.

A passivation layer 133 may be disposed over the switching element 120 to protect the switching element 120. The passivation layer 133 may be formed of an inorganic material, an organic material, or a mixture thereof. In case that the passivation layer 133 is formed of an inorganic material, it may be formed of a single layer of silicon oxide (SiOx), silicon nitride (SiNx) or silicon oxynitride (SiOxNy), or multiple layers thereof. In case that the passivation layer 133 is formed of an organic material, it may be formed of an organic material such as polyimide, benzocyclobutene series resin and acrylate series resin. In case that the passivation layer 133 is formed of a mixture of an inorganic material and an organic material, the organic material may be disposed on the inorganic material to provide a flat surface over level differences.

The pixel electrode 150 may be disposed on the passivation layer 133. The pixel electrode 150 may be electrically connected to the drain electrode 124 through a contact hole 140 and may be controlled by the data driving signal.

The pixel electrode 150 may include a first stem portion 151, branch portions 152 extended from the first stem portion 151 outwardly and spaced apart from one another with a slit or aperture 153 therebetween, and an extension portion 154 extended to the switching elements 120.

The stem portion 151 may include a horizontal stem portion extended in the first direction DR1, and a vertical stem portion extended in the second direction DR2. The stem portion 151 may divide the pixel electrode 150 into subsidiary regions, (or domains). The stem portion 151 may be formed substantially in a cross shape, for example. The pixel electrode 150 may be divided into four subsidiary regions (or domains) by the stem portion 151. The branch portions 152 positioned in different subsidiary regions may be extended in different directions. For example, as shown in FIG. 2, the branch portions 152 positioned in the upper right subsidiary region may be extended obliquely from the stem portion 151 in the upper right direction, while the branch portions 152 positioned in the lower right subsidiary region may be extended obliquely from the stem portion 151 in the lower right direction. The branch portions 152 positioned in the upper left subsidiary region may be extended obliquely from the stem portion 151 in the upper left direction, while the branch portions 152 positioned in the lower left subsidiary region may be extended obliquely from the stem portion 151 in the lower left direction. The extension portion 154 may be extended from the stem portion 151 or the branch portions 152 to the switching element 120 to be electrically connected to the drain electrode 124 through the contact hole 140.

The pixel electrode 150 may include a transparent conductive material through which light may pass. The pixel electrode 150 may be formed of indium tin oxide (ITO), indium zinc oxide (IZO), or indium tin zinc oxide (ITZO). It is, however, to be understood that the disclosure is not limited thereto. The pixel electrode 150 may be formed of any material as long as the material is transparent and conductive.

A first alignment layer 160 may be disposed on the pixel electrode 150. The first alignment layer 160 may include a vertical alignment group, and may induce an initial vertical alignment of the liquid crystals LC in the liquid crystal layer 300 by the vertical alignment group. The first alignment layer 160 may include polyamic acid or polyimide.

The second substrate 200 may include a second insulating substrate 210, a black matrix 220 disposed on the second insulating substrate 210, a color filter 230, and a common electrode 250 disposed on the black matrix 220 and the color filter 230.

The second insulating substrate 210 may be a transparent insulating substrate similar to the first insulating substrate 110. The black matrix 220 may be formed of a material that blocks at least a light of a wavelength band by absorbing or reflecting the light. The black matrix 220 may be disposed at the boundary between adjacent pixels to prevent color mixing defects. For example, the black matrix 220 may be disposed in a substantially stripe shape or a substantially grid shape at the boundary between the pixels PX in the example shown in FIG. 1.

The black matrix 220 may include a carbon black and an array of vertically aligned carbon nanotubes that absorb light. According to an embodiment, as the black matrix includes the carbon black and the array of vertically aligned carbon nanotubes, it may be possible to increase the optical density and lower the reflectance. The black matrix 220 will be described in more detail later.

The color filter 230 may include a material that may absorb a wavelength band of light transmitting therethrough or shifts or converts the wavelength of the light into a certain wavelength. In other words, the color filter 230 may selectively transmit only light of a wavelength band. Although the black matrix 220 and the color filter 230 may be disposed on the second substrate 200 in the example shown in FIG. 3, the color filter 230 may be disposed on the first substrate 100. For example, the color filter 230 may be disposed between the switching element 120 and the pixel electrode 150 of the first substrate 100, and the black matrix 220 may be disposed on the second substrate 200. The black matrix 220 may overlap the switching element 120 and may overlap the data line DL and the gate line GL shown in FIG. 2.

An overcoat layer 240 may be disposed on the black matrix 220 and the color filter 230. The overcoat layer 240 may include an organic material. The overcoat layer 240 may provide a flat surface over level differences that may be created by the elements stacked on the second substrate 200.

The common electrode 250 may be disposed on the overcoat layer 240. The common electrode 250 may be disposed on the multiple pixels to apply a common voltage. The common electrode 250 may generate a vertical electric field in the liquid-crystal layer 300 together with the pixel electrodes 150. The common electrode 250 may form an electric field in the liquid-crystal layer 300 together with the pixel electrode 150 to align the orientation of the liquid crystals LC. Although the pixel electrode 150 may be disposed on the first substrate 100 and the common electrode 250 may be disposed on the second substrate 200 in the example shown in FIG. 3, the pixel electrode 150 and the common electrode 250 may be disposed on the same substrate.

A second alignment layer 260 may be disposed on the pixel electrode 250. The second alignment layer 260 may have substantially the same configuration as the first alignment layer 160; and, therefore, the redundant description will be omitted.

The liquid-crystal layer 300 may be disposed between the first substrate 100 and the second substrate 200. The liquid-crystal layer 300 may include liquid crystals LC. The liquid-crystal composition of the liquid-crystal layer 300 may have a negative dielectric anisotropy or a positive dielectric anisotropy. In their initial alignment, the liquid-crystals LC may have their longer axis aligned in the direction substantially perpendicular to the alignment surface to maintain a stabilized state. The liquid-crystals LC may maintain a stabilized state with a pretilt angle.

The liquid-crystals LC having a negative dielectric anisotropy may be inclined by a vertical electric field generated by the pixel electrode 150 and the common electrode 250 so that their longer axes may form a predetermined angle with respect to the direction of the vertical electric field. As the direction of the longer axis of the liquid-crystals LC is changed, the retardation value may be changed. As a result, the amount of light transmitted through the liquid-crystal layer 300 may be adjusted. As used herein, the initial alignment may refer to the orientation of the liquid-crystals LC in case that no electric field is formed across the liquid-crystal layer 300.

Hereinafter, a black matrix composition that may produce the black matrix 220 will be described.

Figure 4:
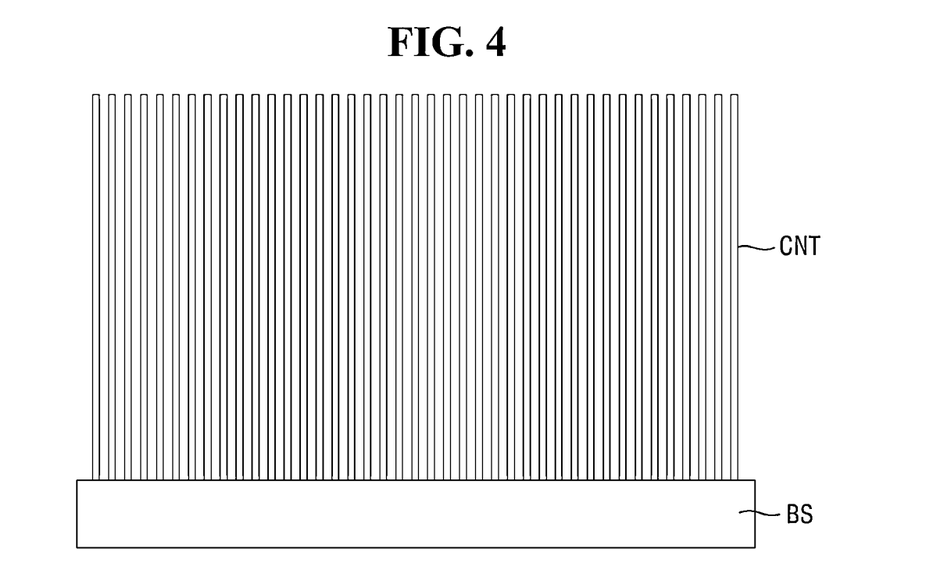
FIGS. 4 and 5 show an array of vertically aligned carbon nanotubes according to an embodiment.
Figure 5:
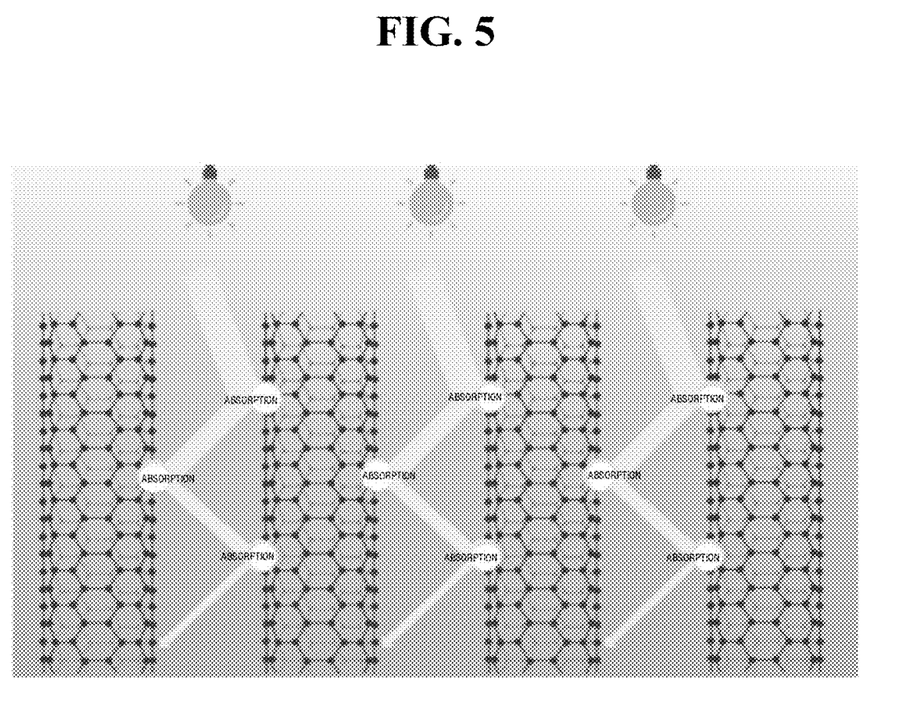

FIGS. 4 and 5 show an array of vertically aligned carbon nanotubes according to an embodiment.

The black matrix 220 may be formed by curing the black matrix composition. The black matrix composition may include a pigment including a carbon black and an array of vertically aligned carbon nanotubes, and solids including binders, monomers, photoinitiators and additives.

The pigment may absorb light to represent black and may include a carbon black carbon and an array of vertically aligned carbon nanotubes.

The carbon black may be black, fine carbon powder, and the size of the carbon particles may be in a range from about 1 to about 500 nm. The carbon black may absorb light and increase the optical density of the black matrix. The content of the carbon black may be in a range of about 15 to about 85 parts by weight per 100 parts by weight of the total pigment. In case that the content of the carbon black is about 15 parts by weight or more per 100 parts by weight of the total pigment, it may be possible to increase the optical density of the black matrix. In case that the content of the carbon black is about 85 parts by weight or less per 100 parts by weight of the total pigment, it may be possible to avoid the reflectance of the interface of the black matrix from increasing.

The array of vertically aligned carbon nanotubes may absorb light and increase the optical density of the black matrix. FIG. 4 is a schematic cross-sectional view of the array of vertically aligned carbon nanotubes according to an embodiment. FIG. 5 is a schematic view showing how the array of vertically aligned carbon nanotubes absorbs light.

Carbon nanotubes may be formed by bonding every single carbon atom with three different carbon atoms to form a substantially hexagonal honeycomb pattern, and by rounding the substantially hexagonal honeycomb pattern to form a tube. The diameter of each of the carbon nanotubes may be several to several hundreds of nanometers.

As shown in FIG. 4, in case that light is incident on the array of vertically aligned carbon nanotubes, the light may be reflected and absorbed at the interface of the carbon nanotubes so that most of the light may be absorbed.

Referring to FIG. 4, the array of vertically aligned carbon nanotubes may be formed by growing multiple carbon nanotubes CNT from a surface of the base layer BS in the vertical direction.

The multiple carbon nanotubes CNT may be vertically aligned with the base layer BS and may be spaced apart from one another on the base layer BS. One end of each of the multiple carbon nanotubes CNT may be in contact with the surface of the base layer BS while the other end thereof may be located or disposed in a direction perpendicular to the surface of the base layer BS.

The base layer BS may work as a substrate for growing the carbon nanotubes CNT. The base layer BS may be one of a glass substrate, a silicon wafer, and a metal layer.

The array of vertically aligned carbon nanotubes may be produced by aligning the carbon nanotubes CNT vertically and growing them on the base layer BS.

As an example, in order to grow the carbon nanotubes CNT, a catalyst, for example, a metal catalyst layer that may form carbon nanotubes may be deposited on the base layer BS. The metal catalyst layer may be formed by depositing a metal to a predetermined thickness on the surface of the base layer BS by sputtering, electron beam evaporation, liquid coating, for example, within the spirit and the scope of the disclosure. The metal catalyst that may form the carbon nanotubes may include, for example, at least one of nickel, iron, cobalt, palladium, platinum, or an alloy thereof. The metal catalyst layer that may form the carbon nanotubes may be formed to a thickness in a range of about 1 to about 100 nm.

The carbon nanotubes CNTs may be formed by vertically growing the carbon nanotubes CNT directly on the metal catalyst layer for forming the carbon nanotubes on the base layer BS using a chemical vapor deposition (CVD) technique or plasma enhanced chemical vapor deposition (PECVD).

The carbon nanotubes may be grown in the vertical direction from the surface of the metal catalyst layer by injecting a carbon-containing gas such as methane, acetylene, ethylene, ethane, carbon monoxide and carbon dioxide together with hydrogen, nitrogen or argon gas in a furnace at a temperature of approximately 400 to 1,000 degrees. Under these conditions, carbonaceous gas may be decomposed and diffused on the surface of the metal catalyst layer so that the carbon nanotubes grow vertically. The above-described method is merely illustrative and a method for producing an array of vertically aligned carbon nanotubes is not limited thereto.

According to an embodiment, the array of vertically aligned carbon nanotubes may be pulverized into flakes for use. For example, the array of vertically aligned carbon nanotubes may be pulverized into flakes by a sonicator to have a size of several to several hundred nanometers.

The content of the array of vertically aligned carbon nanotubes may be in a range of about 15 to about 85 parts by weight per 100 parts by weight of the total pigment. In case that the content of the array of vertically aligned carbon nanotubes is about 15 parts by weight or more per 100 parts by weight of the total pigment, it may be possible to increase the optical density of the black matrix. In case that the content of the array of vertically aligned carbon nanotubes is about 85 parts by weight or less per 100 parts by weight of the total pigment, it may be possible to prevent the reflectance of the interface of the black matrix from increasing.

The content of the solids may be in a range from about 12 to about 25 parts by weight per 100 parts by weight of the total black matrix composition. In case that the content of the solids is about 12 parts by weight or more per 100 parts by weight of the total black matrix composition, it may be possible to increase the efficiency of light absorption of the black matrix. In case that the content of the solids is about 25 parts by weight or less per 100 parts by weight of the black matrix composition, the black matrix composition may be coated well.

The content of the pigment may be in a range from about 15 to about 50 parts by weight per 100 parts by weight of the solids. In case that the content of the pigment is about 15 parts by weight or more per 100 parts by weight of the solids, it may be possible to increase the efficiency of light absorption of the black matrix. In case that the content of the pigment is about 50 parts by weight or less per 100 weight part of the total solids, the pattern of the black matrix may be formed well.

The black matrix composition may include binders. The binders may bond the solids of the black matrix composition and support them in a pattern. The binders may be one or more selected from acrylic resins, imide resins, phenol resins, styrene resins, and cardo resins. These resins may be compounds containing an acid group or an epoxy group.

The content of the binders may be in a range from about 25 to about 40 parts by weight per 100 parts by weight of the solids. The pattern of the black matrix may be formed more effectively in case that the content of the binders is about 25 parts by weight or more per 100 parts by weight of the total solids. In case that the content of the binders is about 40 parts by weight or less per 100 weight part of the total solids, the black matrix composition may be coated well.

The black matrix composition may include monomers. The monomers work as cross-linking agents and may be multifunctional monomers. The multifunctional monomer may include at least one selected from the group consisting of: ethylene glycol diacrylate, triethylene glycol diacrylate, 1,3-butanediol diacrylate, tetramethylene glycol diacrylate, propylene glycol diacrylate, 1,4-cyclohexanediol diacrylate, trimethylol triacrylate, trimethylol propane triacrylate, pentaerythritol triacrylate, tetraethylene glycol diacrylate, dipentaerythritol triacrylate, dipentaerythritol tetraacrylate, sorbitol triacrylate, sorbitol tetraacrylate, sorbitol pentaacrylate, sorbitol hexaacrylate, tetramethylene glycol dimethacrylate, triethylene glycol dimethacrylate, trimethylolpropane trimethacrylate, ethylene glycol dimethacrylate, trimethylol ethane trimethacrylate, 1,3-butanediol dimethacrylate, pentaerythritol dimethacrylate, dipentaerythritol dimethacrylate, pentaerythritol trimethacrylate, bis [p-(3-methacryloxy-2-hydroxy-propoxy) phenyl] dimethylmethane, bis[p-(methacryloxy-epoxy) phenyl] dimethylmethane, sorbitol trimethacrylate, sorbitol tetramethacrylate, 2-ethylhexyl acrylate, 2-hydroxyethyl acrylate, 2-hydroxypropyl acrylate, dimethylaminoethyl acrylate, diethylaminoethyl acrylate, isobornyl acrylate, n-vinylpyrrolidone, 1,4-butylene glycol diacrylate, 1,6-hexanediol diacrylate, diethylene glycol diacrylate, neopentyl glycol diacrylate, tripropylene glycol diacrylate, polyethylene glycol diacrylate, pentaerythritol diacrylate, dipentaerythritol hexaacrylate, tetra-hydrofurfuryl methacrylate, glycidyl acrylate, pentaerythritol tetraacrylate, vinyl acetate, and triallyl cyanurate.

The content of the monomers may be in a range from about 25 to about 40 parts by weight per 100 parts by weight of the total solids. The pattern of the black matrix may be formed more effectively in case that the content of the monomers is about 25 parts by weight or more per 100 parts by weight of the solids. In case that the content of the monomers is about 40 parts by weight or less per 100 weight part of the total solids, the black matrix composition may be coated well.

The black matrix composition may include photoinitiators. The photoinitiators may generate radicals by light to trigger cross-linking. The photoinitiator may use at least one selected from the group consisting of an acetophenone compound, a biimidazole compound, a triazine compound and an oxime compound. The photoinitiator may include at least one selected from the group consisting of: 2-hydroxy-2-methyl-1-phenylpropan-1-one, 1-(4-isopropylphenyl)-2-hydroxy-2-methylpropan-1-one, 4-(2-hydroxyethoxy)-phenyl-(2-hydroxy-2-propyl)ketone, 1-hydroxycyclohexylphenylketone, benzoinmethyl ether, benzoin ethyl ether, benzoin isobutyl ether, benzoin butyl ether, 2,2-dimethoxy-2-phenylacetophenone, 2-methyl-(4-methylthio)phenyl-2-morpholino-1-propane-1-one, 2-benzyl-2-dimethylamino-1-(4-morpholinophenyl)-butan-1-one, 2-(4-bromo-benzyl-2-dimethylamino-1-(4-morpholinophenyl)-butan-1-one, 2-methyl-1-[4-(methylthio) phenyl]-2-Morpholinopropane-1-one, 2,2-bis (2-chlorophenyl)-4,4', 5,5'-tetraphenyl biimidazole, 2,2'-bis (o-chlorophenyl)-4,4', 5,5' tetrakis (3,4,5-trimethoxyphenyl)-1,2'-biimidazole, 2,2'-bis(2,3-dichlorophenyl)-4,4', 5,5'-tetraphenyl biimidazole, 2,2'-bis(o-chlorophenyl)-4,4,5,5'-tetraphenyl-1,2'-biimidazole, 3-{4-[2,4-bis(trichloromethyl)-s-triazin-6-yl]phenylthio} propionic acid, 1,1,1,3,3,3-hexafluoroisopropyl-3-{4-[2,4-bis(trichloromethyl)-s-triazin-6-yl]phenylthio} propionate, ethyl-2-{4-[2,4-bis(trichloromethyl)-s-triazin-6-yl]phenylthio} acetate, 2-epoxyethyl-2-{4-[2,4-bis(trichloromethyl)-s-triazin-6-yl]phenylthio} acetate, cyclohexyl-2-{4-[2,4-bis(trichloromethyl)-s-triazin-6-yl]phenylthio} acetate, benzyl-2-{4-[2,4-bis(trichloro methyl)-s-triazin-6-yl]phenylthio} acetate, 3-{chloro-4-[2,4-bis(trichloromethyl)-s-triazin-6-yl]phenylthio} propionic acid, 3-{4-[2,4-bis (trichloromethyl)-s-triazin-6-yl]phenylthio} propionamide, 2,4-bis(trichloromethyl)-6-p-methoxystyryl-s-triazine, 2,4-bis(trichloromethyl)-6-(1-p-dimethylaminophenyl)-1, 3-butadienyl-s-triazine, 2-trichloromethyl-4-amino-6-p-methoxy styryl-s-triazine, 1,2-octadione-1-(4-phenylthio)phenyl-2-(o-benzoyloxime) and ethanone-1-(9-ethyl)-6-(2-methylbenzoyl-3-yl)-1-(o-acetyloxime).

The content of the photoinitiators may be in a range from about 1 to about 10 parts by weight per 100 parts by weight of the solids. In case that the content of the photoinitiators is about 1 part by weight or more per 100 parts by weight of the solids, cross-linking may be efficiently made. In case that the content of the photoinitiators is about 10 parts by weight or less per 100 weight part of the solids, the black matrix may be developed well.

The black matrix composition may include an additive. The additive may be a surfactant. The surfactant may be coated on the surfaces of the carbon black and/or flakes of the vertically aligned carbon nanotubes to induce spatial repulsion or may be adsorbed on the surfaces to form a stable colloidal dispersion solution while acting as a coupling agent.

The surfactant may include at least one selected from the group consisting of an anionic surfactant, a cationic surfactant, an amphoteric surfactant, and a nonionic surfactant.

The anionic surfactant may include at least one selected from the group consisting of alkyl sulfonic acid (sulfonate), alkyl sulfuric acid (sulfate), aralkyl and alkaryl anionic surfactants, alkyl succinic acid (succinate) and alkyl sulfosuccinates (sulfosuccinate). It may include at least one salt among sodium, magnesium, ammonium, monoethanolamine, diethanolamine and triethanolamine salts of alkaryl sulfonic acid, alkyl sulfonic acid or alkaryl sulfonic acid.

The cationic surfactant may include amine salt or ammonium salt derivative. The amine salt-based cationic surfactant may include polyoxyethylene alkylamine. The quaternary alkyl ammonium-based cationic surfactant may include tetraalkylammonium or pyridinium salt. The quaternary ammonium-based cationic surfactant may include, for example, at least one selected from the group consisting of: alkyltrimethylammonium salts such as cetyltrimethylammonium bromide (CTAB), hexadecyltrimethylammonium bromide, cetyltrimethylammonium chloride (CTAC), cetylpyridinium chloride (CPC), benzalkonium chloride (BAC), benzetonium chloride (BZT), 5-bromo-5-nitro-1,3-dioxane, dimethyldioctadecylammonium chloride, and dioctadecylmethylammonium bromide (DODAB).

The amphoteric surfactant may include at least one selected from the group consisting of: cocoampocarboxyglycinate, cocoampocarboxypropionate, cocobetaine, N-cocoamidopropyldimethylglycine and N-lauryl-N-carboxymethyl-N-(2-hydroxyethyl)ethylenediamine. The amphoteric surfactant may include at least one selected from the group consisting of: quaternary cycloimidates, betaines such as α-(tetradecyldimethylammonio) acetate, beta-(hexadecyldiethylammonio) propionate and gamma-(dodecyldimethylammonio) butyrate.

The nonionic surfactant may include at least one selected from the group consisting of: fatty acid alkanol amide and amine oxide surfactants. The fatty acid alkanol amide may be a nonionic surfactant obtained by the reaction of alkanolamines such as monoethanolamine, diethanolamine, monoisopropanolamine and diisopropanolamine with fatty acids or fatty acid esters to form amides. The fatty acid alkanol amide surfactant may include, for example, at least one selected from the group consisting of: diethanolamide, isostearic acid diethanolamide, lauric acid diethanolamide, capric acid diethanolamide, coconut fatty acid diethanolamide, linoleic acid diethanolamide, myristic acid diethanolamide, oleic acid diethanolamide, stearic acid diethanolamide, monoethanolamide, coconut fatty acid monoethanolamide, oleic acid monoisopropanolamide and lauric acid monoisopropanolamide.

In addition to the surfactants described above, silicone-based surfactants may be included. As the silicone-based surfactant, for example, a copolymer of organosiloxane or dimethylpolysiloxane modified with polyether may be used.

The content of the additive which is the surfactant may be in a range from about 0.1 to about 1 parts by weight per 100 parts by weight of the total solids. In case that the content of the additive is about 0.1 or more per 100 parts by weight of the total solids, the carbon black and/or the flakes of the vertically aligned carbon nanotubes may be dispersed more evenly. In case that the content of the additives is about 1 parts by weight or less per 100 weight part of the solids, the pattern of the black matrix may be formed well.

According to an embodiment, a small amount of a leveling agent, an antifoaming agent, a plasticizer, a dispersant, a dispersion maintaining agent, or the like may be added as the additive of the black matrix composition.

The black matrix composition may include a solvent. The solvent works to disperse the above-described solids and to adjust the viscosity of the composition. The solvent may be a hydrophilic solvent or a hydrophobic solvent.

The hydrophilic solvent may include at least one selected from the group consisting of: water, ethanol, methanol, isopropyl alcohol, butanol, 2-ethylhexyl alcohol, methoxypentanol, butoxyethanol, ethoxyethoxy ethanol, butoxyethoxy ethanol, methoxy propoxy propanol, texanol, alpha-terpineol (α-terpineol), tetrahydrofuran (THF), glycerol, ethylene glycol, triethylene glycol, polyethylene glycol, propylene glycol, dipropylene glycol, dihexylene glycol, propylene glycol methyl ether (PGME), diethylene glycol butyl ether, diethylene glycol ethyl ether, dipropylene glycol methyl ether, dihexylene glycol ethyl ether, glycerin, N-methyl-2-pyrrolidinone (NMP), 2-pyrrolidone, acetylacetone, 1,3-dimethylimidazolinone, thiodiglycol, dimethyl sulfoxide (DMSO), N,N-dimethyl acetamide (DMAc), dimethylformamide (DMF), sulfolane, diethanolamine, triethanolamine.

The hydrophobic solvent may include, for example, at least one selected from the group consisting of methyl ethyl ketone, cyclopentanone, xylene, toluene, benzene, dipropylene methyl ether, methylene chloride and chloroform. According to an embodiment, the hydrophilic solvent or the hydrophobic solvent, whichever is a polar solvent including a polar group, may be used as the solvent.

The content of the solvent may be in a range from about 75 to about 88 parts by weight per 100 parts by weight of the total black matrix composition. In case that the content of the solvent is about 75 parts by weight or more per 100 parts by weight of the total black matrix composition, it may be achievable to coat the thin film to a predetermined thickness. In case that the content of the solvent is about 88 parts by weight or less per 100 parts by weight of the total black matrix composition, the pattern of the black matrix may be formed well.

Hereinafter, the black matrix composition according to the embodiment will be described in Examples and Comparative Examples. It is to be understood that the following examples are merely to illustrate the disclosure and the disclosure is not limited to the following examples.

PREPARATION EXAMPLES

Black matrix compositions in Preparation Examples 1 to 9 were prepared using the compositions shown in Table 1.

COMPARATIVE EXAMPLES

Black matrix compositions in Comparative Examples 1 to 6 were prepared using the compositions shown in Table 1.

TABLE 1

|  | CB | VC | Binder | Monomer | Photoinitiator | Surfactant | Solvent |
| --- | --- | --- | --- | --- | --- | --- | --- |
| P. Example 1 | — | 1.75 | 44 | 44.25 | 9 | 1 | 500 |
| P. Example 2 | — | 3.5 | 44 | 42.5 | 9 | 1 | 500 |
| P. Example 3 | — | 7.0 | 42 | 41 | 9 | 1 | 500 |
| P. Example 4 | 6 | 10 | 39 | 35 | 9 | 1 | 500 |
| P. Example 5 | 10 | 9 | 37 | 34 | 9 | 1 | 500 |
| P. Example 6 | 15 | 8 | 35 | 32 | 9 | 1 | 500 |
| P. Example 7 | 20 | 7 | 33 | 30 | 9 | 1 | 500 |
| P. Example 8 | 25 | 6 | 31 | 27 | 9 | 1 | 500 |
| P. Example 9 | 28 | 5 | 30 | 26 | 9 | 1 | 500 |
| C. Example 1 | 5 | — | 45 | 40 | 9 | 1 | 500 |
| C. Example 2 | 10 | — | 43 | 37 | 9 | 1 | 500 |
| C. Example 3 | 20 | — | 38 | 32 | 9 | 1 | 500 |
| C. Example 4 | 30 | — | 33 | 27 | 9 | 1 | 500 |
| C. Example 5 | 40 | — | 28 | 22 | 9 | 1 | 500 |
| C. Example 6 | 50 | — | 23 | 21 | 5 | 1 | 500 |

In Table 1, the content of each composition is expressed in wt %, CB denotes the carbon black, and VC denotes the array of vertically aligned carbon nanotubes. Benzyl methacrylate was used as the binder, ethylene glycol diacrylate was used as the monomer, benzoin methyl ether was used as the photoinitiator, copolymer of dimethylpolysiloxane was used as the additive, and propylene glycol monomethyl ether acetic acid was used as the solvent.

EXPERIMENTAL EXAMPLES

The black matrix was prepared by coating the black matrix composition according to each of Examples 1 to 9 and Comparative Examples 1 to 6 on a glass substrate having the size of 100 mm×100 mm.

Figure 6:
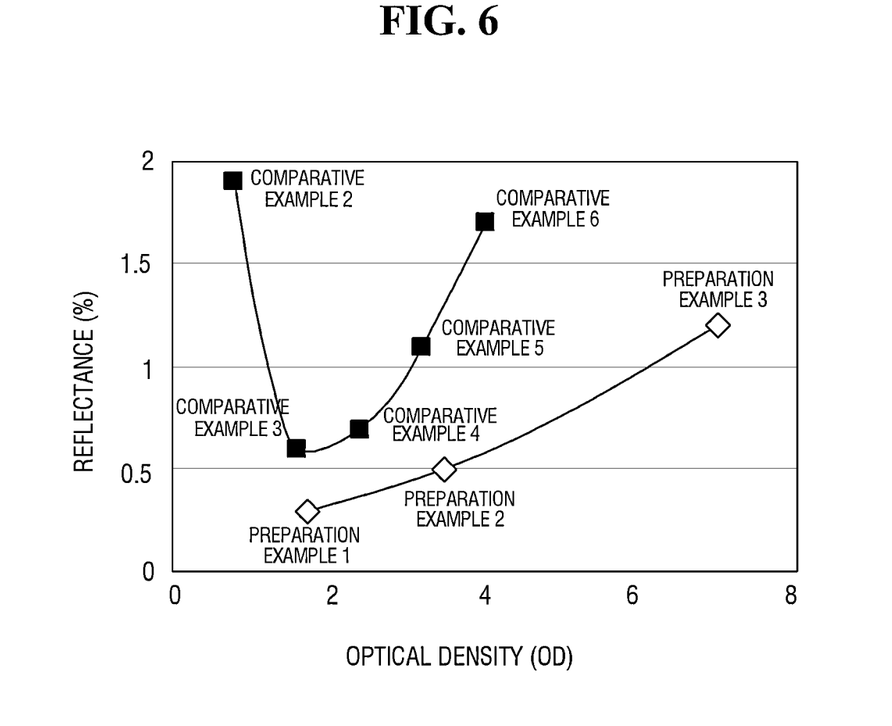
FIG. 6 is a graph showing the reflectance versus the optical density of the black matrix prepared in each of Comparative Examples 1 to 6 and Examples 1 to 3.

The optical density and reflectance of the black matrix were measured and shown in Table 2 below. The reflectance versus the optical density of the black matrix prepared in each of Comparative Examples 1 to 6 and Preparation Examples 1 to 3 is shown in FIG. 6.

TABLE 2

|  | Optical Density | Reflectance (%) |
| --- | --- | --- |
| P. Example 1 | 1.75 | 0.3 |
| P. Example 2 | 3.5 | 0.5 |
| P. Example 3 | 7.0 | 1.2 |
| P. Example 4 | 3.98 | 0.5 |
| P. Example 5 | 3.95 | 0.5 |
| P. Example 6 | 4.00 | 0.6 |
| P. Example 7 | 4.05 | 0.6 |
| P. Example 8 | 4.02 | 0.7 |
| P. Example 9 | 3.99 | 0.7 |
| C. Example 1 | 0.40 | — |
| C. Example 2 | 0.80 | 1.9 |
| C. Example 3 | 1.60 | 0.6 |
| C. Example 4 | 2.40 | 0.7 |
| C. Example 5 | 3.20 | 1.1 |
| C. Example 6 | 4.00 | 1.7 |

It can be seen from Table 2 that, among Comparative Examples 1 to 6 containing only the carbon black as the pigment, Comparative Examples 1 to 5 exhibited low optical densities of about 0.40, 0.80, 1.60, 2.40 and 3.20, respectively, while Comparative Example 6 exhibited the optical density of about 4.00 with the reflectance of about 1.7%, which is high.

Among Examples 1 to 3 containing only the array of vertically aligned carbon nanotubes as the pigment, Examples 1 and 2 exhibited low optical densities of about 1.75 and 3.5, respectively, while Example 3 exhibited the optical density of about 7.0, which is very high.

Referring to FIG. 6, for the black matrix prepared from the black matrix composition including only the carbon black as the pigment, there is the tendency that as the content of the carbon black increases, the reflectance decreases and then sharply increases, while the optical density gradually increases. In case that the optical density is about 4.00, the reflectance was about 1.7%, which is high.

For the black matrix prepared from the black matrix composition including only the array of vertically aligned carbon nanotubes as the pigment, there is the tendency that as the content of the array of vertically aligned carbon nanotubes increases, the optical density and the reflectance gradually increases.

In view of the above, it may be understood that the reflectance of the black matrix may be reduced by mixing the carbon black with the array of vertically aligned carbon nanotubes.

In this regard, Examples 4 to 9 including the carbon black and the array of vertically aligned carbon nanotubes as the pigment exhibited the optical densities of about 3.98, 3.95, 4.00, 4.05, 4.02 and 3.99, respectively, and the reflectances of about 0.5%, 0.5%, 0.6%, 0.6%, 0.7% and 0.7%, respectively. Examples 4 to 9 including the carbon black and the array of vertically aligned carbon nanotubes as the pigment exhibited the optical density in the range of about 3.95 to about 4.05 and the reflectance in the range of about 0.5% to about 0.7%, which satisfy the requirements of high optical density and low reflectance for the black matrix.

Accordingly, the black matrix according to an embodiment includes the carbon black as well as the array of vertically aligned carbon nanotubes as the pigment, so that it may be possible to increase the optical density and lower the reflectance of the black matrix.

In concluding the detailed description, those skilled in the art will appreciate that many variations and modifications may be made to the embodiments without substantially departing from the principles. Therefore, the disclosed embodiments are used in a generic and descriptive sense only and not for purposes of limitation.

What is claimed is:

1. A display device comprising:
 a first substrate including:
  a switching element; and
  a pixel electrode electrically connected to the switching element; and
 a second substrate opposite to the first substrate and including a black matrix, the black matrix including:
  a carbon black; and
  an array of vertically aligned carbon nanotubes, wherein
 the array of vertically aligned carbon nanotubes is in the form of flakes,
 the carbon black has a carbon particle size in a range of about 1 nm to about 500 nm,
 the black matrix has an optical density in a range of about 3.95 to about 4.05, and
 the black matrix has a reflectance in a range of about 0.5 to about 0.7%.

2. The display device of claim 1, wherein the array of vertically aligned carbon nanotubes includes:
 a base layer; and
 a plurality of carbon nanotubes spaced apart from one another on the base layer.

3. The display device of claim 2, wherein each of the plurality of carbon nanotubes includes:
 an end in contact with a surface of the base layer; and
 another end disposed in a direction perpendicular to the surface of the base layer.

4. The display device of claim 2, wherein the base layer includes one of a glass substrate, a silicon wafer, and a metal layer.

* * * * *